United States Patent
Larsson

(10) Patent No.: US 9,794,773 B2
(45) Date of Patent: Oct. 17, 2017

(54) MOBILE DEVICE MANAGEMENT

(71) Applicant: GIESECKE & DEVRIENT GMBH, Munich (DE)

(72) Inventor: Thomas Larsson, Alvsjo (SE)

(73) Assignee: GIESECKE & DEVRIENT GMBH, Munich (DE)

( * ) Notice: Subject to any disclaimer, the term of this patent is extended or adjusted under 35 U.S.C. 154(b) by 172 days.

(21) Appl. No.: 14/813,476

(22) Filed: Jul. 30, 2015

(65) Prior Publication Data

US 2016/0080930 A1    Mar. 17, 2016

(30) Foreign Application Priority Data

Sep. 11, 2014 (EP) .................................. 14003151

(51) Int. Cl.
*H04W 8/18* (2009.01)
*H04W 48/18* (2009.01)
*H04W 48/16* (2009.01)

(52) U.S. Cl.
CPC ........... *H04W 8/183* (2013.01); *H04W 48/16* (2013.01); *H04W 48/18* (2013.01)

(58) Field of Classification Search
CPC ....... H04W 36/16–36/32; H04W 8/18; H04W 8/183; H04W 48/16; H04W 48/18
See application file for complete search history.

(56) References Cited

U.S. PATENT DOCUMENTS

| 2004/0156348 | A1* | 8/2004 | Cheng | H04W 36/245 |
| | | | | 370/338 |
| 2006/0030319 | A1 | 2/2006 | Chou et al. | |
| 2007/0297362 | A1 | 12/2007 | Kimura et al. | |
| 2013/0273914 | A1* | 10/2013 | Speks | H04W 48/18 |
| | | | | 455/435.1 |

FOREIGN PATENT DOCUMENTS

WO    2006/123916 A1    11/2006

OTHER PUBLICATIONS

Extended European Search Report from EP Application No. 14003151.9, Feb. 20, 2015.

* cited by examiner

*Primary Examiner* — Pao Sinkantarakorn
(74) *Attorney, Agent, or Firm* — Workman Nydegger

(57) ABSTRACT

A method for managing, e.g. subscriptions on a security element of, a mobile device comprises the steps of recognizing a new network and initiating a management step. In order to recognize the new network, information about a network selected by the mobile device is captured. Then, the captured information is evaluated in order to recognize the new network. Further, it is determined whether the captured information satisfies a specified stability condition. If this is the case, the management step is initiated.

17 Claims, 2 Drawing Sheets

MOBILE DEVICE MANAGEMENT

BACKGROUND

The present invention relates to a method for managing a mobile device, particularly a subscription of the mobile device, an accordingly arranged mobile device, and to a security element for a mobile device.

A user of a mobile device, for example a mobile radio end device, a smart phone or a tablet computer, has access to a mobile communication network of a certain network operator based on his subscription. The mobile device typically stores the access data, such as IMSI and an authentication key, of the subscription. A subscription is thus normally attached to a network of a specific network operator. It specifies the conditions describing and limiting a data communication of the user over the network. A subscription can be formed by an application installed in a security element of the user's mobile device. Such an application can also be arranged to manage a plurality of subscriptions. The application has for example the task of securely storing and managing access data necessary for accessing the data communication network of the network operator, for example an access key. Typically, a mobile device only supports one active subscription at a time.

The security element used may be for example a UICC/SIM mobile radio card or a secure region in the end device, a so-called TEE ("trusted execution environment"), to be described more exactly hereinafter.

For a mobile device several different networks can be selectable, depending for example on the location, the current time or the like. It is e.g. possible that, when the user of the mobile device moves, the mobile device automatically selects a new network, e.g. when the user crosses the border between two countries. Depending on the selected network, it may be advantageous or desirable for the user of the mobile device to replace a currently activated subscription by another subscription, i.e. to change the subscription. Advantageously, the new subscription is attached to the currently selected network. However, in particular in situations where the mobile device repeatedly selects a new network rather frequently, e.g. in border regions, common automatic subscription management causes problems.

SUMMARY

The object of the present invention is to propose a method for managing a mobile device, preferably a subscription thereof, the method taking this problem into account.

This object is achieved by a method, a security element and a mobile device having the features of the independent claims. Advantageous embodiments and developments are stated in the dependent claims.

A preferred embodiment of a method for managing, e.g. subscriptions—preferably stored on a security element—for, a mobile device comprises the following steps:

Basically, when a new network is recognized, i.e. when it is recognized, that the mobile device has selected a new network, which network differs from the previously selected network, a (subscription) management step can be initiated.

In order to recognize a newly selected network, in a first step, information about a network selected by the mobile device is captured. Such information can be in particular an identifier of the selected network or an identifier of a mobile radio cell of the selected network. The step of capturing information about a network selected by the mobile device is normally repeated at regular or irregular intervals. In this way, the captured information can be kept current, and changes in the selection of networks can be promptly recognized.

In a second step following the capturing step, the captured information is evaluated in order to recognize the new network, i.e. the network newly selected by the mobile device. In the evaluation step, in general, the selected network is identified.

In a further step, it is determined whether the captured information satisfies a specified stability condition. The captured information is said to satisfy a stability condition within the meaning of the present invention if the captured information indicates that the selection of the network by the mobile device is in some respects stable and lasting. In the determining step, information that has been captured in one or more earlier capturing steps is for example compared with information that has been captured in one or more later capturing steps. In so doing, it can be recognized for example that there has been captured in a later capturing step a network's identifier that had not yet been captured at an earlier time.

Finally, if the specified stability condition is satisfied, a (subscription) management step is initiated.

Different stability conditions can be specified here, which will be described in detail hereinafter. Each of these stability conditions ensures in its way that the selection of the new network is stable and lasting in a certain way. In this way, the initiating of the subscription management step is prevented from being already effected when the mobile device e.g. accidentally selects a new network for a short period of time or when the selection of the network changes frequently, e.g. in a border region.

According to a first preferred embodiment, there can be initiated as a subscription management step the loading of a subscription to the security element of the mobile device. In so doing, the loaded subscription can for example be associated with the selected network.

According to a second preferred embodiment, there can be initiated as a subscription management step a changing of the subscription. In so doing, a currently active subscription is normally deactivated and another subscription activated. This other subscription can already have been present in an executable way on the security element of the mobile device previously or, as mentioned hereinabove, be loaded to the security element of the mobile device for the purpose of activation. In so doing, the services of an external subscription management system can be utilized.

Normally, all steps of the method are executed by at least one application on the mobile device. Preferably, this at least one application is executed on the security element of the mobile device. It is e.g. possible that one application carries out the capturing step, the evaluating step, and the determining step, while the subscription management is up to another application.

According to a preferred embodiment of the method, a specified stability condition is satisfied when the captured information about a network selected by the mobile device remains unchanged over a specified minimum time period. According to a weaker variant of the embodiment, it can be required that the captured information essentially remains unchanged over the specified minimum time period, i.e. for example at least over a specified portion of the minimum time period.

The question of whether or not the captured information about a network selected by the mobile device remains unchanged over a specified minimum time period is e.g. determined by checking whether or nor the same information about the selected network is captured in each or almost each capturing step that is carried out within the specified minimum time period.

According to a further preferred embodiment, a specified stability condition can be regarded as satisfied when the captured information about a network selected by the mobile device remains unchanged in a specified minimum number of capturing steps. This embodiment is preferably implemented employing a counter. In so doing, the counter can for example be incremented upon each capturing step if the information about the selected network is the same. In case information about a new network is captured that differs from the previously selected network, the counter is generally reset. According to a variant of the embodiment, it can be required that information captured about the selected network is the same at least in a specified number of directly consecutive capturing steps. According to a further variant, it can be provided that the counter is reset when no information about the selected network is captured in a certain number of directly or indirectly consecutive steps.

According to a further preferred embodiment, a specified stability condition is satisfied when in a specified minimum number of capturing steps an identifier of the same selected network is captured and when in each of the capturing steps of the specified minimum number of capturing steps a captured identifier of a mobile radio cell of the selected network differs from the identifier of the mobile radio cell captured in the preceding capturing step.

According to a preferred variant of the above-described embodiment, the stability condition can be regarded as satisfied when at least a second specified minimum number of mutually different identifiers of a mobile radio cell of the selected network are captured in a first specified minimum number of capturing steps. In this way, it can be assumed in all probability that the selected network into whose effective range a user of the mobile device has moved is selected by the mobile device in a stable and lasting way.

This variant is preferably implemented with the aid of a list or the like and extends the counter solution. Now those capturing steps that capture information about the selected network are no longer only counted, but rather the individual captured information is additionally stored in a list or the like. In this way, it can be recognized for example whether information about only one or very few mobile radio cells is always only captured, or whether the user of the mobile device was situated in the area of a relatively great minimum number of different mobile radio cells. Additionally or alternatively to the identifiers of the mobile radio cells, there can be stored in such a list other, temporally or spatially varying information about the network.

It will be appreciated that normally an above-mentioned counter or a last-described list is respectively reset when an initiated subscription management step has then been carried out. The counter and/or the list are generally also reset in case it is determined that the information captured about the network selected by the mobile device does finally not satisfy the specified stability condition.

Generally, the determining step is only carried out in case the selected network is not listed in a predefined network list, which list can e.g. be stored in the mobile device or the security element. In this way, resources of the mobile device and/or the security element can be saved. The network list can e.g. include a number of networks, that, when selected, do not give rise to a change of the currently activated or a default subscription.

Preferably, the management step is a subscription management step. A subscription at least comprises network access data, e.g. an subscriber identifier (IMSI, SIP address, IMPU . . . ) and a network access key (Ki, . . . ). In most of the present systems the network access data are locally stored in a secure element of the mobile device. Mobile devices using remote subscriptions, wherein the network access data are at least partly only stored and used by a server. The subscription data of the device may comprise subscription profile data. The subscription management step thus preferably comprises amending the subscription data, which are stored in the mobile device or in the remote subscription server for the mobile device. For example, a second subscription may be loaded and/or activated. The present solution does not require amendments in/may advantageously coexist with other components of the mobile communication network, such as a device management server and/or a server changing network selection rules. However, the management step could as well comprise: notifying a central server, e.g. that the user now is abroad, that the subscription has changed or that it should be changed now, starting an application on the mobile device or amending function limitations on the secure element of the mobile device.

A preferred embodiment of a security element, according to the invention, of a mobile device comprises at least one application which is arranged to carry out a hereinabove described method.

A preferred embodiment of a mobile device having a security element comprises at least one application which is arranged to execute a method of the hereinabove described type. The application can be present on the end device itself or on a security element integrated into the end device.

BRIEF DESCRIPTION OF THE DRAWINGS

The present invention will be described hereinafter by way of example with reference to the attached drawings. Therein.

DETAILED DESCRIPTION OF VARIOUS EMBODIMENTS

Hereinafter a method for managing subscriptions on a security element of a mobile device will be described by way of example in connection with so-called "roaming". Here, a user of the end device moves on the border of two mutually overlapping networks, in particular at the border between two countries. The method is fundamentally not restricted to roaming, however, and can be used in other application contexts.

Figure 1:
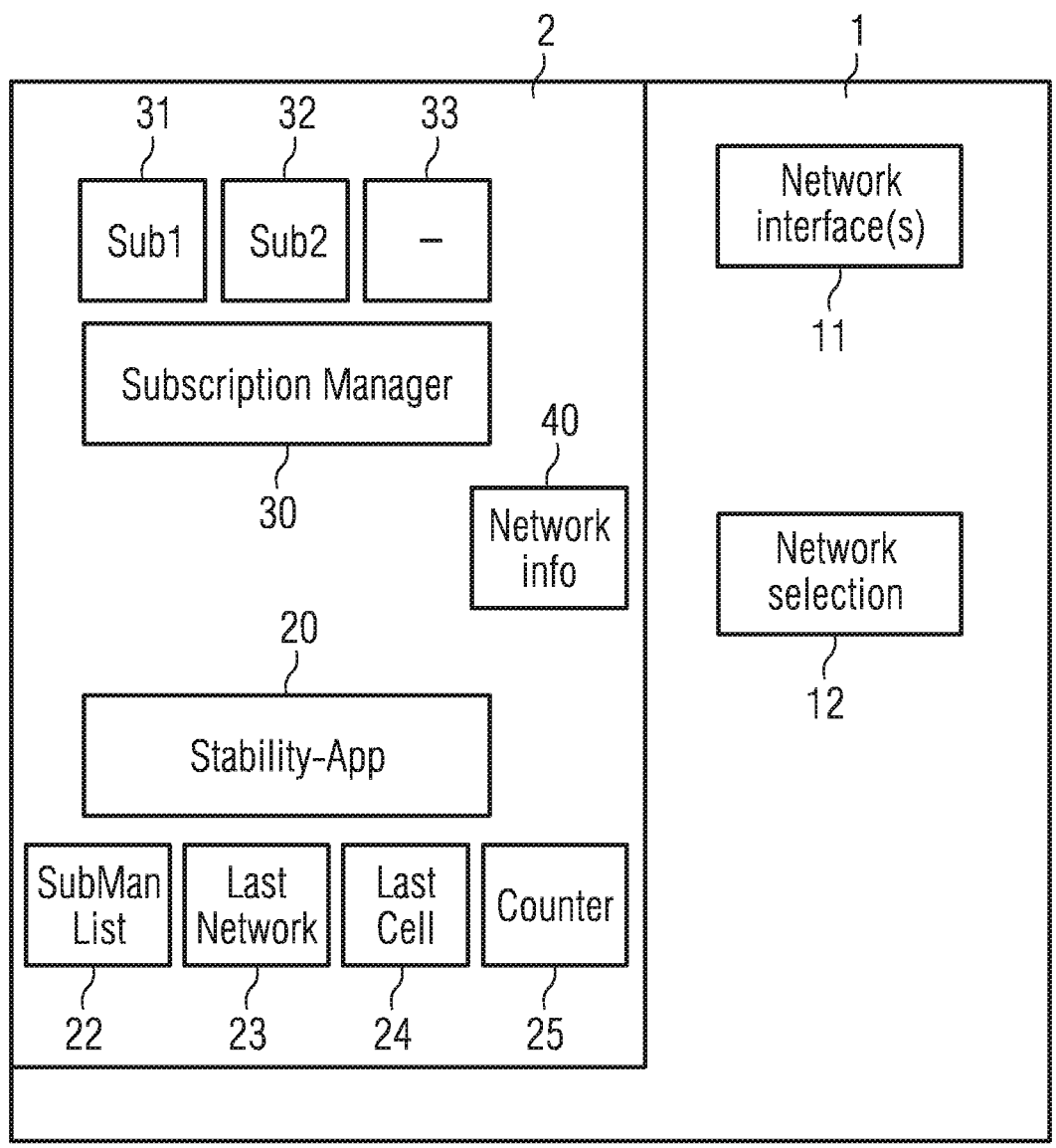
FIG. 1 shows components of a preferred embodiment of an inventive mobile device having integrated a preferred embodiment of an inventive security element.

FIG. 1 schematically shows a mobile device 1 into which a security element 2, e.g. in the form of a UICC, is integrated. The mobile device 1, e.g. a smart phone, includes at least one common network interface 11 in order to be attached to a selected network. The network can be selected by the mobile device 1 by means of a network selection application 12.

On a security element 2 of the end device 1 one or more subscriptions 31, 32, 33 can be present. Normally, one thereof is active at a time. The security element 2 includes a subscription management application 30 that is arranged to manage the different subscriptions 31, 32, 33, e.g. to change subscriptions and/or load new subscriptions.

The subscriptions 31, 32, 33 can be present on a conventional, known security element 2—for example an UICC/SIM card, a secure mass storage card or an embedded secure element (eUICC)—or be downloaded onto the security element in the form of a virtual SIM (vSIM). The security element 2 in use may also be a secure region formed in the end device by suitable software means and/or hardware means, for example in the form of a so-called "trusted execution environment" (TEE).

A TEE is in general a secure region and can in principle also be made available merely on the basis of a suitable software architecture within an operating system. However, a TEE is preferably realized by providing different regions within a suitable processor, i.e. a normal region ("normal world") and a secure region ("secure world") that is separated therefrom by hardware technology. An accordingly arranged processor is based for example on the known ARM TrustZone® technology. The normal region can run a conventional operating system, for example Android. The secure region uses a special security operating system, for example MobiCore.

The security element 2 further includes a number of memory areas that are arranged to store certain parameters which govern the method described below with reference to FIG. 2. In a memory area 40 ("Network info"), e.g., an identifier of a network currently selected by the mobile device 1, can be stored. Further memory areas 22, 23, 24, and 25 can be provided in order to store a predefined network list ("SubManList"), called "subscription management list", an identifier of the network ("Last Network") and the mobile radio cell of that network ("Last Cell") previously identified, and a counter ("Counter"). The specific meaning of the respective terms will become evident below with reference to the method for managing subscriptions on a security element of a mobile device. The method can be carried out by a specific application 20 ("stability app") on the mobile device 1 or, as shown in FIG. 1, on the security element 2.

Figure 2:
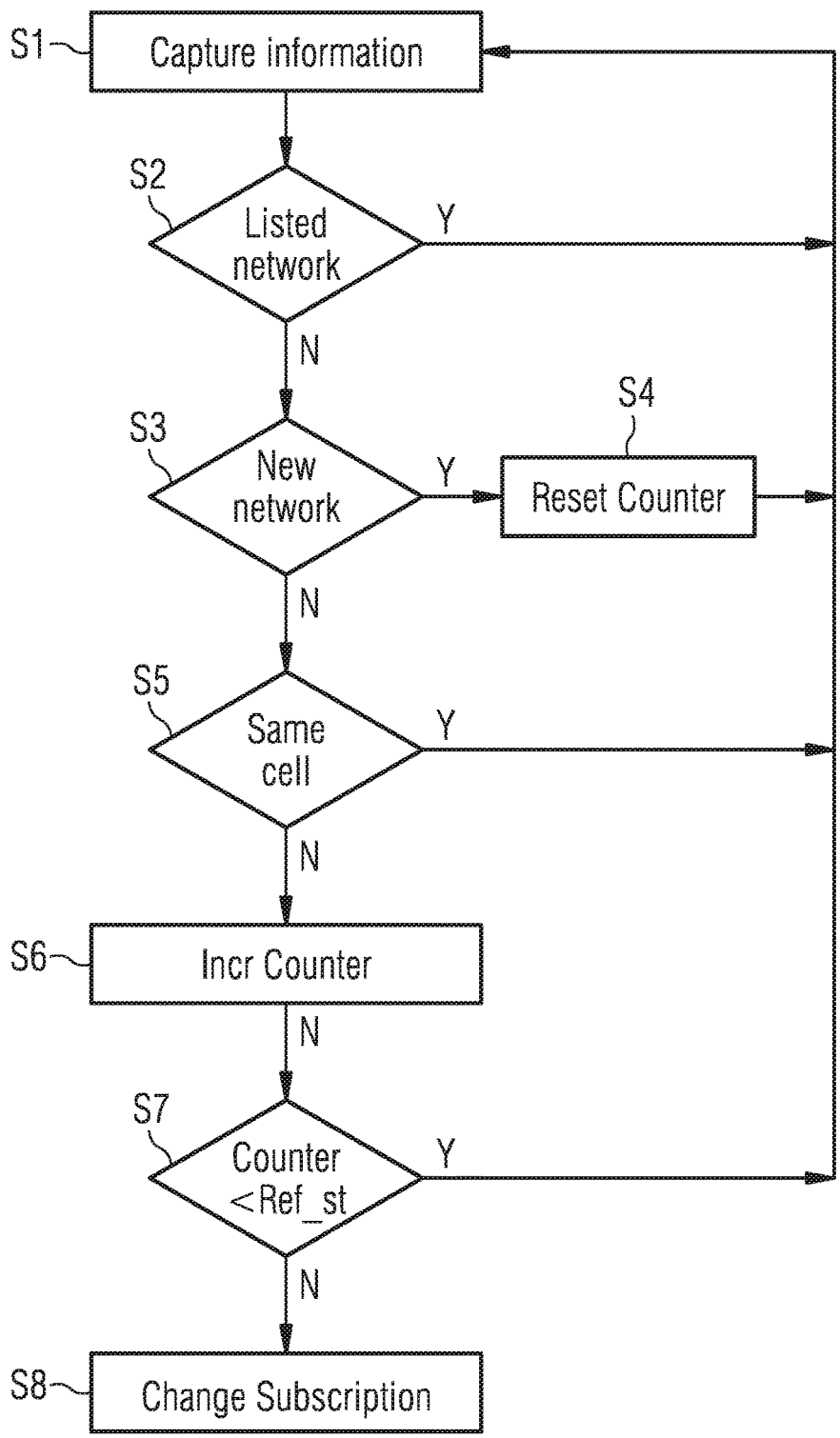
FIG. 2 shows steps of a preferred embodiment of a method according to the invention.

As indicated in FIG. 2, in a first step S1, information about a network selected by the mobile device 1 is captured. This step, as well as normally the hereinafter described steps S2 to S8, are preferably executed by at least one application 20, 30 on the mobile device 1. The at least one application 20, 30 can be executed on the mobile device 1 itself or preferably on a security element 2 of the mobile device 1.

The term "information about a network selected" in particular includes an identifier of the selected network and/or an identifier of a mobile radio cell of the selected network.

Normally, the capturing step S1 is carried out regularly, i.e. at specified intervals.

In step S2 it is determined whether the selected network is listed in a predefined network list, referred to as "subscription management list" in the example. This list can be stored on the security element 2 and contains a list of networks, that, when selected, do not give rise to a subscription management, in particular to a change of the currently active subscription.

Only in case the selected network is identified as not being included in the "subscription management list", it is determined in step S3 whether the selected network is new, i.e. whether the network that has been identified as selected in the preceding capturing step, and an identifier of which has e.g. been stored in the memory area 23 ("Last Network"), is the same as the network which is currently selected.

In case the currently selected network is new, i.e. differs from the previously selected network, the counter 25 is reset.

Further, the memory area 23 is updated to now store the identifier of the currently selected network, and the method continues with step S1.

In case, however, it is determined that the selected network has not changed since the last capturing step, i.e. the currently selected network is not new, the method can proceed with step S6, namely by incrementing the counter 25.

In an optional step S5, before incrementing the counter 25, it can be determined whether the identifier of the mobile radio cell actually captured is the same as the identifier of the mobile radio cell that was captured in the previous capturing step, the latter identifier being stored e.g. in the memory area 24 ("last cell"). Only in case the memory cell has changed, indirectly indicating that the user of the mobile device has moved within the region of the selected network, the counter 25 is incremented (step S6). Otherwise, the method continues with step S1.

According to a variant of step S5, it can further be determined whether the identifier of the mobile radio cell currently captured differs from respective identifiers captured in the last n, e.g. the last 5 or 10, capturing steps. This variant necessitates storing not only the "last cell", but the last n cells, e.g. in suitable data structure, such as a FIFO-List.

In step S7 it is determined whether the captured information "is stable", i.e. satisfies a specific stability condition. Stability, in the example, is measured by the counter 25. In each round, when the selected network remains stable, i.e. no new network is selected (cf. step S3, omitting optional step S5), the counter is incremented (cf. step S6). According to the variant including optional step S5, stability further means that the user of the mobile device moves in or into the area of the selected network, which can be seen by the changing identifiers of the mobile radio cell (cf. step S5).

In case the counter has reached a given stability threshold ("Ref_st"), a subscription management step is initiated in step S8, e.g. a change of the subscription. In other words, the currently active subscription is deactivated and a subscription is activated which can be associated with the selected network. In so doing, it is possible that the subscription to be newly activated, before being activated, is first loaded to the security element of the end device. This loading step can be supported by an external subscription management system. Generally, in case a subscription management step is initiated, the counter 25 and the memory areas 22 to 24 are reset. Otherwise, the method proceeds with step S1.

The described method thus makes it possible in a simple way to recognize a selected network and helps to avoid unwanted effects that can occur at the borders of mutually overlapping networks. Further, the method can remain transparent to the user of the end device and normally requires no adapting of external systems.

The invention claimed is:

1. A method for managing a mobile device having access to a network, the method comprising the steps of:
   capturing information about a network selected by the mobile device;
   evaluating the captured information to recognize whether the network selected by the mobile device is a new network;
   determining whether the captured information satisfies a specified stability condition;
   initiating a management step for the network selected by the mobile device if the specified stability condition is satisfied, wherein the specified stability condition is satisfied when in a specified minimum number of capturing steps an identifier of the same selected network is captured and in each of the capturing steps of the specified minimum number of capturing steps a captured identifier of a mobile radio cell of the selected network differs from the identifier of the mobile radio cell captured in the preceding capturing step.

2. The method according to claim 1, wherein there is initiated as the management step a subscription management step by a loading of a subscription to the security element of the mobile device.

3. The method according to claim 1, wherein there is initiated as the management step a changing of the subscription.

4. The method according to claim 1, wherein at least one of the steps of the method or all steps of the method, are executed by at least one application on the mobile device or by at least one application on the security element of the mobile device.

5. The method according to claim 1, wherein in the capturing step there is captured as information about a network selected by the mobile device an identifier of the selected network and/or an identifier of a mobile radio cell of the selected network.

6. The method according to claim 1, wherein the capturing step is repeated at regular or irregular intervals.

7. The method according to claim 6, wherein in the determining step information that has been captured in one or more earlier capturing steps is compared with information that has been captured in one or more later capturing steps.

8. The method according to claim 1, wherein a specified stability condition is satisfied when the captured information about a network selected by the mobile device remains unchanged over a specified minimum time period.

9. The method according to claim 1, including determining whether the captured information about a network selected by the mobile device remains unchanged over a specified minimum time period by checking whether the same information about the selected network is captured in each capturing step that is carried out within the specified minimum time period.

10. The method according to claim 1, wherein a specified stability condition is satisfied when the captured information about a network selected by the mobile device remains unchanged in a specified minimum number of capturing steps.

11. The method according to claim 1, wherein a specified stability condition is satisfied when at least a second specified minimum number of mutually different identifiers of a mobile radio cell of the selected network are captured in the specified minimum number of capturing steps.

12. The method according to claim 1, wherein the determining step is only carried out in case the selected network is not listed in a predefined network list.

13. The method according to claim 1, wherein all steps of the method are executed by at least one application on the mobile device.

14. The method according to claim 1, wherein at least one of the steps of the method is executed by at least one application on the security element of the mobile device.

15. The method according to claim 1, wherein all steps of the method are executed by at least one application on the security element of the mobile device.

16. A mobile device comprising:
a security element, and
a network interface,
wherein the mobile device is configured to perform at least the following:
capture information about a network selected by the mobile device;
evaluate the captured information to recognize whether the network selected by the mobile device is a new network;
determine whether the captured information satisfies a specified stability condition;
initiate a management step for the network selected by the mobile device if the specified stability condition is satisfied,
wherein the specified stability condition is satisfied when in a specified minimum number of capturing steps an identifier of the same selected network is captured and in each of the capturing steps of the specified minimum number of capturing steps a captured identifier of a mobile radio cell of the selected network differs from the identifier of the mobile radio cell captured in the preceding capturing step.

17. One or more non-transitory computer-readable mediums having stored thereon executable instructions that when executed by the one or more processors configure a mobile device to perform at least the following:
capture information about a network selected by the mobile device;
evaluate the captured information to recognize whether the network selected by the mobile device is a new network;
determine whether the captured information satisfies a specified stability condition;
initiate a management step for the network selected by the mobile device if the specified stability condition is satisfied,
wherein the specified stability condition is satisfied when in a specified minimum number of capturing steps an identifier of the same selected network is captured and in each of the capturing steps of the specified minimum number of capturing steps a captured identifier of a mobile radio cell of the selected network differs from the identifier of the mobile radio cell captured in the preceding capturing step.

* * * * *